United States Patent [19]

Moore

[11] Patent Number: 4,616,510
[45] Date of Patent: Oct. 14, 1986

[54] FLUID VELOCITY MEASURING METHOD AND APPARATUS

[75] Inventor: James O. Moore, Worcester, Pa.

[73] Assignee: Moore Products Company, Spring House, Pa.

[21] Appl. No.: 723,501

[22] Filed: Apr. 15, 1985

[51] Int. Cl.⁴ .............................................. G01F 1/66
[52] U.S. Cl. .................................................. 73/861.27
[58] Field of Search ................. 73/597, 861.27, 861.28

[56] References Cited

U.S. PATENT DOCUMENTS

| | | | |
|---|---|---|---|
| 2,921,467 | 1/1960 | Hedrich et al. | 73/861.27 |
| 3,165,928 | 1/1965 | Poulos . | |
| 3,641,817 | 2/1972 | Dory . | |
| 4,011,755 | 3/1977 | Pedersen . | |
| 4,262,545 | 4/1981 | Lamarche et al. . | |
| 4,389,899 | 6/1983 | Krause | 73/861.28 |
| 4,478,088 | 10/1984 | Loveland | 73/861.28 |

*Primary Examiner*—Herbert Goldstein
*Attorney, Agent, or Firm*—Synnestvedt & Lechner

[57] ABSTRACT

An acoustic flow meter in which a plurality of different frequencies are transmitted in both upstream and downstream directions, and corresponding differences in transmission phase-delays due to such frequency changes detected and used to compute the fluid velocity by the formula $$V_F = \pi L \left( \frac{1}{M_D} - \frac{1}{M_u} \right),$$

when L is the distance between transmitter and receiver, $M_D$ is the slope of the graph of phase delay vs. transmitted frequency for the upstream direction of transmission, and $M_u$ is the corresponding slope for the downstream direction. A signal processor using a least-squares algorithm is preferably employed to obtain best values for $M_D$ and $M_u$ from the several values of phase-delay difference produced by the several different transmitted frequencies.

10 Claims, 6 Drawing Figures

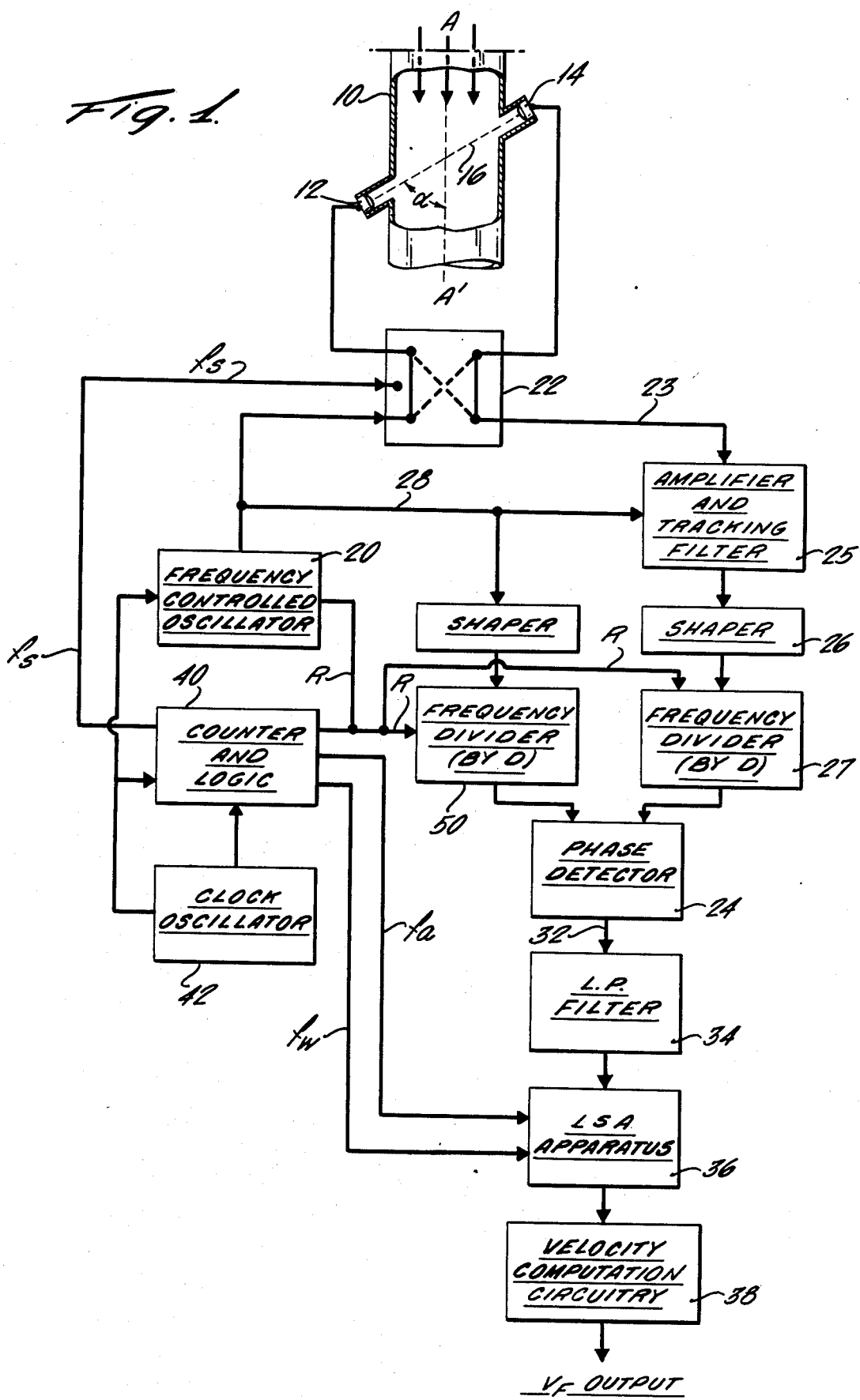

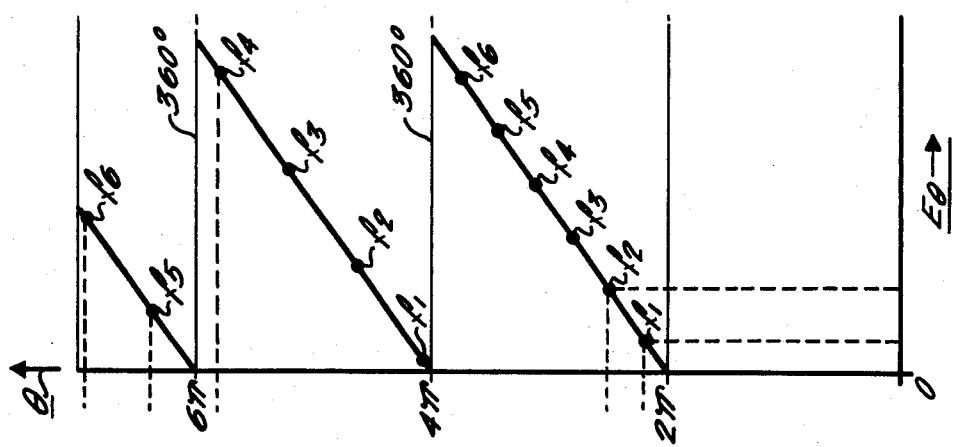
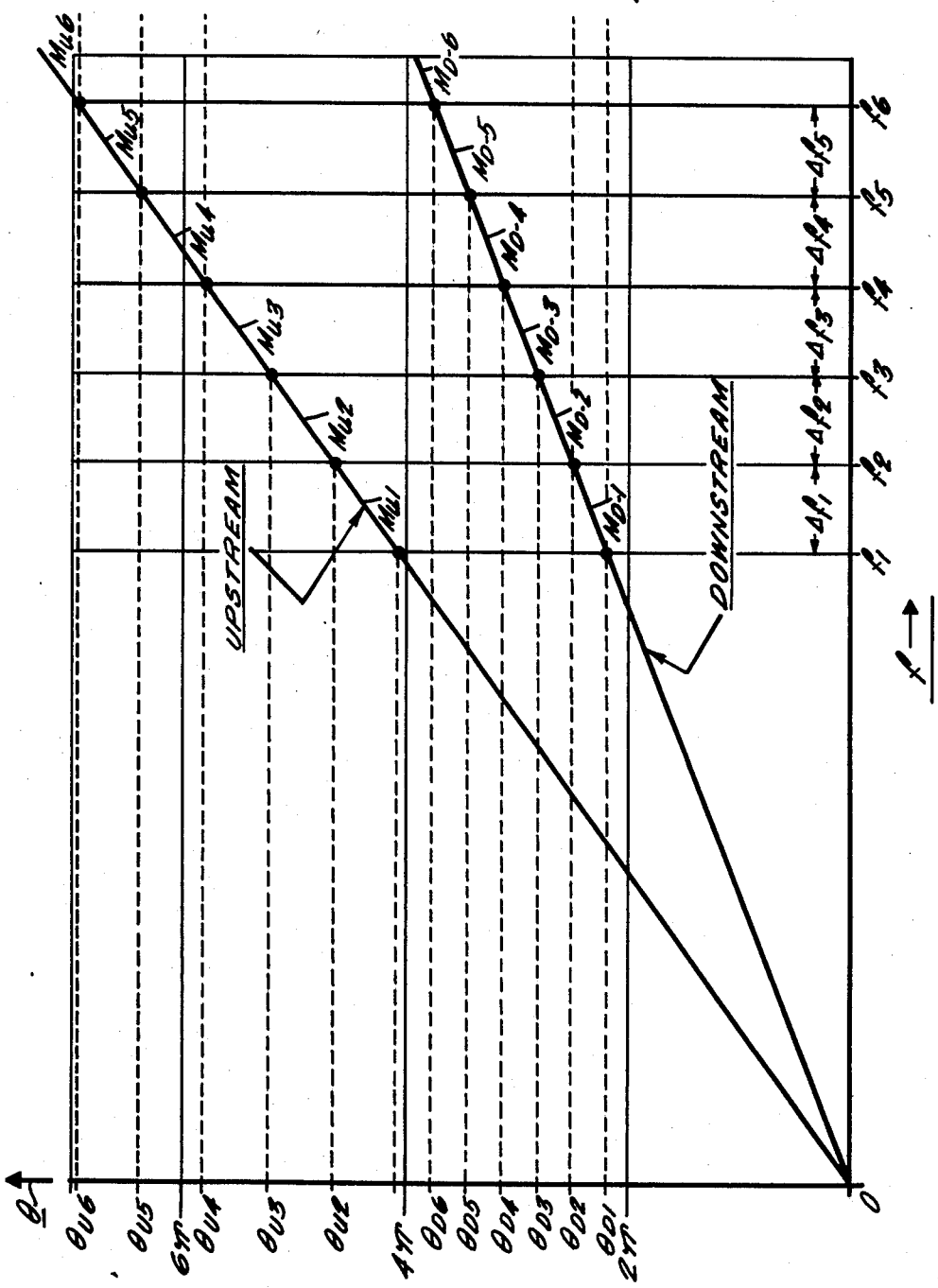

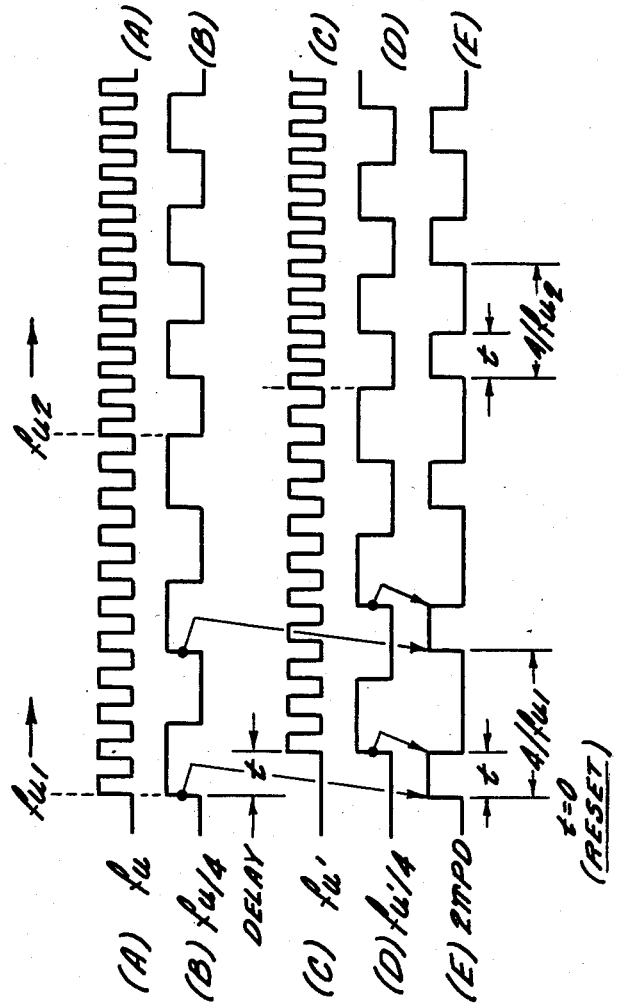

FLUID VELOCITY MEASURING METHOD AND APPARATUS

BACKGROUND OF THE INVENTION

This invention relates to a method and apparatus for the measurement of the velocity of fluids, and particularly to such method and apparatus which utilize the transmission of acoustic waves through the moving fluid.

It is known in the art to determine the velocity of a fluid by transmitting acoustic waves through the moving fluid from a transmitter of acoustic waves to a receiver of acoustic waves and deriving from the received acoustic waves indications of the velocity of the fluid; the acoustic waves are transmitted in a direction which has at least a substantial component parallel to the direction of fluid flow, and preferably such transmissions are effected both in the upstream and downstream directions and the information contained in the received waves combined to obtain the desired fluid velocity indications. Thus while transmission in one direction alone will provide information useful for some purposes, the use of upstream and downstream transmissions increases the accuracy greatly since it eliminates the factor of the velocity $v_0$ of the acoustic waves in still fluid and is not dependent thereon, which velocity $v_0$ typically may vary substantially with such factors as temperature and composition of the fluid, including for example its content of gaseous, liquid or solid materials.

In order to accomplish the upstream and downstream type of fluid velocity measurement with the best accuracy, it is known to utilize two acoustic transducers between which the fluid flows, each such transducer serving alternately as a transmitter and a receiver of acoustic waves. More particularly, first one transducer acts as a transmitter to transmit acoustic waves to the other transducer acting as a receiver, and then the other transducer is caused to transmit acoustic waves to the first transducer which then acts as a receiver. In this way, undesired differences in upstream and downstream acoustic wave delays due to use of different transducers for the two directions of transmission are greatly mitigated.

Known types of acoustic fluid velocity measuring systems include the Doppler frequency system which detects apparent changes in acoustic wave frequency due to fluid motion, but which has the drawback that particles must normally be present in the fluid in order to develop a suitable signal, and that accuracy is usually limited to about 5% at best.

It is also known to measure fluid velocity by transmitting a short acoustic-wave pulse through the fluid to the receiver, and measuring directly the propagation delay of the impulse in travelling from transmitter to receiver; this again may be done in both the upstream and downstream directions. Typically the pulse delay is converted to a frequency equal to 1/delay by means of a feedback circuit, and the difference between the resultant "upstream" and "downstream" frequencies is used as a measurement of flow velocity which is substantially independent of sound velocity in the still fluid. A limitation of this method is that in order to get the necessary resolution of the pulses, the transducer must operate in the megahertz region where propagation losses are undesirably high in liquids, and so high in gases as to make the system virtually unuseable. Also, the necessity for transmitting and receiving a narrow pulse limits the energy available for detection, and for best results requires use of transducers with very wide bandwidths.

Phase comparison methods are also known to measure the fluid velocity. In such systems the phase of the transmitted signal is compared to that of the received signal; typically the phase delay for downstream propagation is compared with the phase delay for upstream propagation to give a sensitive measurement of fluid flow rate. This technique has the advantage that greater signal power can be transmitted then when only a narrow transmitted pulse is used, providing a better signal to noise ratio. Also, the frequencies employed are lower than in the narrow-pulse system, making operation in gas practical, with generally less attenuation in any medium.

However, known phase comparison methods depend on knowledge of ambient sound velocity $v_0$, which varies widely with temperature and type of fluid. Also, accuracy will generally suffer if there are any significant reflections of the acoustic waves from the transducers or from the surrounding walls of the fluid chamber. Particularly troublesome are triple reflections directly off the transducer faces themselves. Standing waves caused by such reflections can often affect the accuracy by 50% or more; also, linearity as the function of fluid velocity is affected by such standing waves.

It is therefore an object of the present invention to provide a new and useful method and apparatus for measuring the velocity of a fluid.

Another object is to provide such method and apparatus which retain the principal advantages of the phase comparison methods of measurement previously known, but avoid or greatly reduce the drawbacks associated with previously known phase comparison methods.

Still another object is to provide such method and apparatus which is accurate over a wide range of temperatures and fluid types and compositions, and at the same time provides accurate measurement.

SUMMARY OF THE INVENTION

In accordance with the invention, the velocity of the fluid is determined by transmitting through it at different times acoustic waves of different frequencies, rather than of the same frequencies, and detecting the differences in phase delay of such transmitted signals due to the differences in frequencies between the acoustic waves producing the phase delays. By means of apparatus and steps described in detail hereinafter, the signals representing the differences in the frequencies and the corresponding differences in the phase delays of the acoustic waves are used to determine the velocity of the fluid through which the waves propagate.

As an example, and as demonstrated hereinafter, the fluid velocity $V_f$ may be expressed as:

$$V_F = \pi L \left( \frac{1}{\Delta\theta_d/\Delta f_d} - \frac{1}{\Delta\theta_u/\Delta f_u} \right),$$

where L is the spacing between a pair of transmitting and receiving acoustic transducers, $\Delta\theta_d$ is the change in phase delay of the downstream acoustic wave due to a shift $\Delta f_d$ in frequency, and $\Delta\theta_u$ is the change in phase delay of the acoustic waves transmitted upstream due to a shift in frequency $\Delta f_u$.

Further in accordance with the invention, it has been noted that, for a constant spacing between the transducers and for any given fluid velocity $\Delta\theta_d/\Delta f_d$ and $\Delta\theta_u/\Delta f_u$ may be represented as the slopes $M_d$ and $M_u$, of straight line graphs representing the relationship between frequency and phase delay for the downstream and upstream transmission cases respectively. The measurement described above utilizing a pair of different transmission frequencies in each direction of propagation provides an indication of each of these slopes. However, due to spurious signals caused by such things as undesired reflections and second-round echoes from the transducers, in practice these graphs for the up and down transmissions are not the idealized straight lines one might expect. Instead they tend to oscillate back and forth between opposite sides of the true idealized line. If one or both of the frequencies utilized for the phase delay measurement occurs at a point which is not on the idealized straight line graph, the slope measurement obtained from use of these two frequencies will usually be in error. It is therefore desirable to utilize a substantial number of pairs of different frequencies and to average the slope measurements thereby obtained or, preferably, to apply other statistical data-enhancing techniques to them, such as least-squares curve-fitting.

Furthermore, the pairs of frequencies utilized to determine the frequency versus phase-delay slopes are preferably close enough to each other that the corresponding differences in phase delay are less than 360° ($2\pi$ radians). In such cases there is never any ambiguity in the measurement with respect to whether the phase delay that occurs is equal to the measured value $\theta$ or to a phase delay $\theta + N2\pi$, as would otherwise occur when utilizing a conventional phase comparison type of phase detector. The frequency differences used can be constant, can be the same for upstream and downstream measurements, can be equal or unequal to each other, or can be random with respect to frequency and with respect to frequency difference. By utilizing a random choice of frequencies, phase errors due to facts such as those described above can to some extent be averaged out, especially if they occur cyclically as a function of frequency.

In some cases the phase change produced by a difference $\Delta f$ in frequency of a pair of transmitted frequencies may be less than 360°, but may bridge the zero-phase condition of the phase comparator; for example, $f_1$ might produce a phase delay $\theta_1$ of 350° and $f_2$ might produce a phase delay $\theta_2$ of 370°, giving a phase difference $\theta_2-\theta_1$ of 20°. Since the typical phase detector would sense a change from 350° to 10°, rather than from 350° to 370°, its output would typically provide a false indication of $\theta_2-\theta_1$. In order to avoid such an anomalous measurement, it it possible to use apparatus which detects such an anomalous direction of change between frequencies of a frequency pair, and to add 360°, or $2\pi$ radians, to the second measurement, so that the measured difference between the phase delays due to the two different frequencies will be correct. However, in the preferred embodiment, a novel technique is used in which the frequencies of all received transmissions are divided by a factor D such that even though the phases of the received signals may extend over several multiples of 360°, the frequency-divided signals exhibit phase changes of less than 360°, and the phase ambiguity is thereby removed.

BRIEF DESCRIPTION OF FIGURES

These and other objects and features of the invention will be more readily understood from a consideration of the following detailed description, taken in connection with accompanying drawings, in which:

FIG. 1 is a schematic block diagram illustrating a preferred embodiment of the overall system of the invention;

FIGS. 2A and 2B are graphical representations to which reference will be made in explaining the theory of the invention;

FIGS. 3 and 4 are graphical representations to which reference will be made in explaining the operation of a preferred embodiment of the invention.

DETAILED DESCRIPTION OF SPECIFIC EMBODIMENTS

Figure 5:
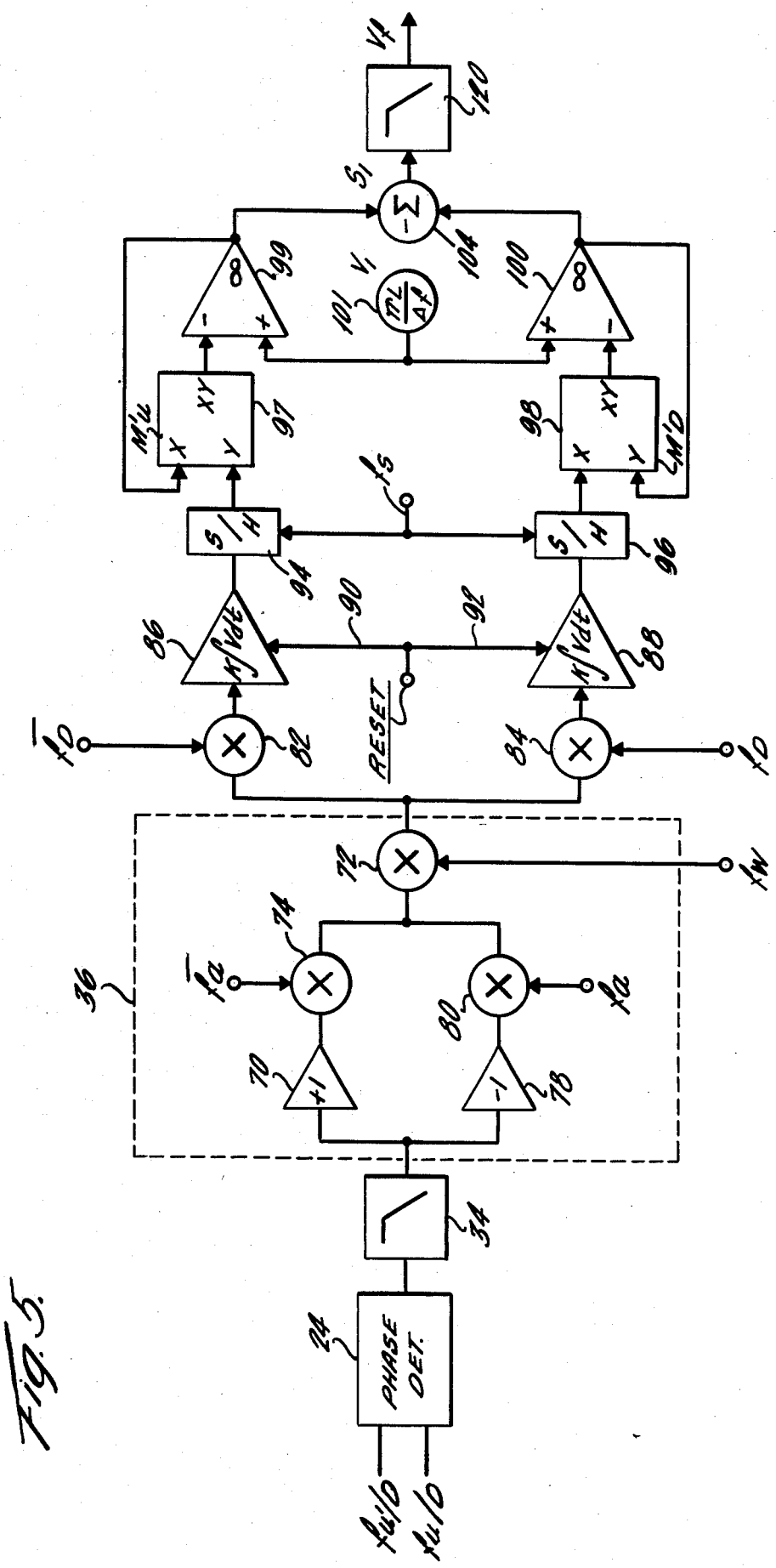
FIG. 5 is a more detailed block diagram of a preferred form for a portion of the system of FIG. 1.

Referring first to FIG. 1, there is shown a conduit 10 through which a fluid flows in the direction of the arrows. A pair of transmitter-receiver acoustic transducers 12 and 14 face each other across the conduit, along a line 16 extending obliquely across the conduit, so that the fluid flow has a component along the direction of the conduit axis A–A[1]. Each transducer is chosen to be able to transmit acoustic waves at appropriate frequencies through the fluid to the other transducer, and each is also capable of acting as an efficient receiver of such waves from the other transducer. Accordingly, one transducer may be used first as a transmitter while the other one is used as a receiver, and then the other may be used as a transmitter while the first one acts as a receiver. The ultimate objective is to measure the velocity of fluid flow along the axis of the conduit, which is done by measuring the velocity $V_F$ along the axis 16 of the transducers and multiplying this by a known constant equal to the cosine of the angle $\alpha$ between the transducer axis and the conduit axis.

Electrical signals for operating the transmitter-receiver transducers 12 and 14 are supplied from the frequency controlled oscillator 20 by way of a reversing switch 22. Reversing switch 22 is shown schematically as a mechanical double-poled double-throw switch, with cross-connections to achieve reversal, but it will be understood that in actuality it will almost always be a high-speed electronic switch performing these same functions. In the position of the switch shown in full line, the reference electrical oscillations from oscillator 20 are supplied by the switch 22 to transducer 12 for transmission, and are received by transducer 14; in the opposite position of the switch shown in broken line, the oscillations are supplied to the other transducer 14 for transmission and are received by transducer 12.

Received signals from the transducers are supplied over line 23 to a phase detector 24, by way of an amplifier and tracking filter 25, a pulse shaper 26 and a frequency divider 27 which is part of the receiver for the system.

Amplifier and tracking filter 25 may be conventional, and is supplied with a tracking control signal from oscillator 20 over line 28 so that the passband of the filter will automatically track the frequency of the received signal and thus enable efficient noise rejection. Shaper 26 may also be conventional, and serves to convert the amplified received signals into corresponding square wave signals. The frequency divider 27 has a special purpose, described in detail hereinafter.

The phase detector 24 is also supplied with the original frequency-controlled oscillations from oscillator 20 over line 28 by way of a conventional shaper 29 and the special divider 50, the latter signal serving as a reference phase signal for the phase detector. The phase detector 24 produces an output on its output line 32 which is indicative of the phase delay $\theta$ of the signal received by the phase detector, relative to the phase of the signal at the oscillator and at the transmitting transducer. The phase-delay indicating signal on output line 32 is supplied to the low-pass filter 34 and then through the LSA apparatus 36 to the velocity computation apparatus 38, which produces an output signal representative of the velocity $V_F$ of the fluid in conduit 10 along the line 16 in FIG. 1.

The oscillator 20 is controlled by the counter and logic apparatus 40 and by clock oscillator 42, to generate and supply to the transducers oscillations at predetermined controlled frequencies, which may be designated $f_1, f_2 \ldots f_n$. Counter and logic apparatus 40 also produces the signal $f_s$ which acts over line 44 to operate the switch 22, as well as other timing signals described hereinafter.

As will be discussed hereinafter in detail, in its operation the apparatus of FIG. 1 will measure the upstream phase delay $\theta_u$ for each of a plurality of frequencies and thus develop a set of signals ($\theta_{ui}, f_{ui}$) representing corresponding pairs of values of phase delay and frequency; similarly, the equipment measures the downstream phase delay $\theta_d$ for each of the same plurality of frequencies to produce corresponding pairs of frequency and delay data ($\theta_{di}, f_{di}$). The data ($\theta_{ui}, f_{ui}$) and ($\theta_{di}, f_{di}$) are then used to compute the desired fluid velocity $V_f$ from the latter input information and from a knowledge of the transducer separation L.

The general theory upon which the system and process operate may be summarized as follows.

Let:
$V_F$ = fluid velocity along direction of acoustic waves.
$v_u$ = acoustic wave velocity upstream
$v_d$ = acoustic wave velocity downstream
L = distance between upstream and downstream stations
$v_o$ = velocity of acoustic waves at zero flow velocity.

$$v_u = v_o - V_F,$$

$$v_d = v_o + V_F,$$

whence $$V_F = \tfrac{1}{2}(v_d - v_u). \tag{1}$$

Also, $$v_d = L/t_d, \; v_u = L/t_u, \tag{2}$$

where $t_d$ and $t_u$ are wave transit times down and up stream. Substituting (2) into (1):

$$V_F = \tfrac{1}{2} L \, (1/t_d - 1/t_u) \tag{3}$$

The phase delays $\theta_u$ and $\theta_d$ are measures of $t_u$ and $t_d$, and specifically $$t_d = \theta_d/2\pi f_d \; \text{and} \; t_u = \theta_u/2\pi f_u \tag{4}$$

Hence, substituting (4) into (3):

$$V_F = \tfrac{1}{2}\left( \frac{L}{\theta_d/2\pi f_d} - \frac{L}{\theta_u/2\pi f_u} \right) \tag{5}$$

or $$V_F = \pi L \left( \frac{1}{\theta_d/f_d} - \frac{1}{\theta_u/f_u} \right). \tag{6}$$

Now, $\theta_d = M_d f_d$ and $\theta_u = M_u f_u$ (where $M_d$ and $M_u$ are constants for a given L and at a given $v_D$ or $v_U$), hence $$V_F = \pi L \left( \frac{1}{M_d} - \frac{1}{M_u} \right). \tag{7}$$

One could therefore measure $\theta_d$ and $\theta_u$ and calculate $V_F$ from (5), (6) or (7), using the same or different frequencies for $f_u$ and $f_d$, and preferably performing the measurement for many different sets of frequencies and averaging the results, However, this assumes that the total phase delays $\theta_u$ and $\theta_d$ can both be measured readily, accurately and without ambiguity of phase, which is generally not the case;

According to the invention, it is recognized that the incremental slope $$\frac{\Delta\theta}{\Delta f} = \frac{\theta_2 - \theta_1}{f_2 - f_1}$$

equals the overall slope $\theta/f$, and that ($\Delta\theta/\Delta f$) can be measured readily, accurately, and without phase ambiguity. Accordingly, pursuant to the invention one may evaluate equation (7) by measuring $\Delta\theta_u$, $\Delta f_u$, $\Delta\theta_d$ and $\Delta f_d$, and computing $V_F$, preferably by the formula:

$$V_F = \pi L \left( \frac{1}{\Delta\theta_d/\Delta f_d} - \frac{1}{\Delta\theta_u/\Delta f_u} \right), \tag{8}$$

One could use $\Delta\theta$ and $\Delta f$ in equation (5), in equation (6), or in some other transformation of equation (7) to calculate $V_F$, the essential thing being the use of more than one frequency in measuring both upstream and downstream phase delays, and use of the resulting information in making the calculation. That is, "incremental" slope is measured and used in the formula, and preferably many different pairs of frequencies are used for this purpose, as described below.

These considerations will become more clear by reference to the following, taken with FIGS. 2A and 2B. In FIG. 2A, abscissae represent transmitted frequencies and ordinates represent phase delay of signals propagating between the two transducers by way of the moving fluid, while in FIG. 2B ordinates represent phase delay and abscissae represents the output voltage $E_\theta$ of the phase detector. Here it is assumed that, within a time so short that the nature and velocity of the fluid does not change appreciably, six different frequencies $f_1, f_2 \ldots f_6$ are transmitted sequentially downstream and then sequentially in the upstream direction.

The difference between the frequency $f_1$ and the frequency $f_2$ is designated as $\Delta f_1$, the difference between frequency $f_2$ and $f_3$ is designated $\Delta f_2$ and so on. Thus it is assumed that in this example the frequency differences utilized are $f_2-f_1$, $f_3-f_2$, $f_4-f_3$, $f_5-f_4$, and $f_6-f_5$.

Each of these frequencies $f_1$ through $f_6$ produces a signal having a corresponding phase delay in transit through the fluid; for $f_1$ the delay is $\theta_{d1}$, for $f_2$ it is $\theta_{d2}$, etc. during downstream transmission, while for upstream transmission $f_1$ produces the phase delay $\theta_{u1}$, $f_2$ produces the phase delay $\theta_{u2}$, etc. These differences in phase delay corresponding to $\Delta f_1$, $\Delta f_2$, etc. are $\theta_{d2}-\theta_{d1}$ and $\theta_{d3}-\theta_{d2}$ etc. for the downstream transmission, and $\theta_{u2}-\theta_{u1}$ and $\theta_{u3}-\theta_{u2}$ etc. for the upstream transmission. The phase delay difference $\theta_{d2}-\theta_{d1}$ is designated herein as $\Delta\theta_{d1}$ corresponding to the frequency difference $\Delta f_1$, and similarly for the other frequency and phase delay increments.

The straight-line graph in FIG. 2A designated "Downstream" is the idealized straight-line graph, of slope $M_d$, defining the idealized proportionality constant between frequency and phase delay for the downstream transmission case, for an arbitrary fluid velocity. For other velocities, its slope will be different. The portions of that graph between the plotted data points for the six different frequencies have incremental slopes indicated as $M_{d1}$, $M_{d2}$, etc., and in this idealized case each of these incremental slopes is the same as the overall slope $M_d$.

The upper straight-line graph designated "Upstream" is the corresponding graph defining the idealized relationship between frequency and phase delay for upstream transmissions, and the overall slope thereof may be designated as $M_u$, with its incremental slopes indicated as $M_{u1}$, $M_{u2}$, etc.

Shown in FIG. 2B, at the right-hand side, is a graph showing the idealized output voltage $E_\theta$ of a standard phase detector used in the position of phase detector 24 of FIG. 1, as it would be produced by the various phase delays $\theta$ of FIG. 2A due to the various frequencies f. The dots on the straight-line graph of $E_\theta$ represent the phase detector output voltages for the upstream and downstream transmissions at $f_1$ through $f_6$. These coordinate represent the $(\theta_{ui}, f_{ui})$ and $(\theta_{ui}, f_{di})$ data referred to above.

In this connection, attention is invited to the frequency change from $f_4$ to $f_5$ during upstream transmission, for which the voltage $E_\theta$ is greater at the higher frequency $f_5$ than at the lower frequency $f_4$ because the phase delay has passed through 360° between $f_4$ and $f_5$. In all other cases shown, the higher the frequency the higher the voltage. As mentioned earlier, this anomolous direction of phase-detector output voltage may be sensed and used to add 360° to $\theta_{u5}$, so that the difference between the phase detector voltages at $\theta_5$ and $\theta_4$ properly represents $\theta_{u5}-\theta_{u4}$. However, as will be described, it is preferred to avoid this problem of ambiguity instead by use of frequency dividers preceding the phase detector.

While it is recognized that in the future a design using software to perform the manipulations of the data pairs $(f_i, \theta_i)$ to obtain a signal representing flow velocity may be preferred, at present the preferred form of system actually designed is that illustrated in FIG. 1 and in the detailed block diagram of FIG. 4. This system uses the frequency divider 27 for the received signals, and a corresponding frequency divider 50 for the reference signal from oscillator 20, the purpose and operation of which will be appreciated from FIG. 3 and the following discussion.

FIG. 3 illustrates the general timing arrangement utilized in this preferred form of the invention. At A of the Figure is represented the signal transmitted by one of the transducers, say transducer 12, first at a frequency $f_{u1}$, and then at a frequency $f_{u2}$; while during actual transmission through the fluid the signals may not have the idealized rectangular shape shown, they approach this form after reception and shaping, and since the timing considerations are the same, for simplicity the signal is shown as comprising rectangular pulses throughout the waveform diagrams.

At C of FIG. 3 is shown the signal shown at A after it has passed through the fluid has been received by the other transducer 14, and has passed through the shaper 26. The delay $\tau$ of the received signal shown at C, with respect to the transmitted signal shown at A, is equal to $L/v_0$, i.e. equals the separation between transducers divided by the velocity of sound in the fluid between the transducers. This delay is the same for $f_{u1}$ as for $f_{u2}$. At B of FIG. 3 is shown the output of divider 50, due to the reference signal, and at D of FIG. 3 is shown the output of divider 27 produced by the received signal. For simplicity in exposition the value D of both dividers is represented as being 4.

Dividers 27 and 50 are reset to zero by reset pulses from counter and logic 40 at $\tau=0$ in FIG. 3, and hence both dividers start out in the same state. Accordingly, the output of divider 50, shown at B, is the same as the output of divider 27, shown at D, except that the entire waveform D is delayed by $\tau$. The phase detector 24 receives the signals B and D from the dividers, and produces an output therefrom shown at E which has a duty cycle proportional to the phase differences between signals B and D. That is, the percentage of the time for which the output of the phase detector is high is proportional to $\tau$ and inversely proportional to the wave period P. This percentage of time, equal to $\tau/P$, therefore represents the phase delay of the acoustic wave, and is detected by filter 34. As f increases (as from $f_{u1}$ to $f_{u2}$), and the corresponding period P of the acoustic waves decreases, the output of phase detector 24 increases toward 100%.

As will be described hereinafter in detail, due to the use of the dividers the effective period P is increased for measurement purposes by the divider factor D, and the delay $\tau$ can therefore vary over about a D times greater range, without ambiguity of output, than if the described divider system were not used.

In the system of FIGS. 1 and 3, the transmitted frequencies are exactly known by the equipment which generates them, and it is therefore only the corresponding values of phase delay $\theta$ which need to be measured and which therefore are subject to some error. Furthermore, the transmitted frequencies are varied in equal steps. In such case a graph of $\theta$ as a function of transmitted frequency should ideally be a straightline of slope M, but, as mentioned previously, due to errors the measured values of $\theta$ will be scattered on each side of the ideal straight line. A least-squares algorithm is preferably used in this example to arrive at the actual value of M to be used in the formula for computing fluid velocity $V_F$. It will be understood that there are many other ways that the value of M could be arrived at, including various known averaging and curve-fitting techniques. However, the LSA approach is believed to produce a worthwhile improvement in results compared with such other methods.

For the specific embodiment being considered then, a normalized slope M' may be expressed as follows, where $M' = M\,\Delta f = \Delta\theta$:

$$M' = \frac{1}{K_M} \sum_{i=1}^{i=N} a_i \theta_i \qquad (9)$$

where $K_M$ is a function of the value of N and may be expressed as:

$$K_M = \sum_{i=1}^{i=N} a_i i \qquad (10)$$

In Eq. (10), the coefficients $a_i$ are such as to form an arithmetic progression such that $$a_i = -a_{N+1-i} \qquad (11)$$

and such that $$\sum_{i=1}^{i=N} a_i = 0. \qquad (12)$$

For N equal to 8 (the value which will be used in the specific set of parameter values set forth hereinafter), the expression for M' becomes $$M' = 7\theta_1 + 5\theta_2 + 3\theta_3 + \theta_4 - \theta_5 - 3\theta_6 - 5\theta_7 - 7\theta_8 \qquad (13)$$

In the specific embodiment of FIG. 5, the latter algorithm is implemented by the LSA apparatus 36, comprising in this example a non-inverting amplifier 70 connected to a time-weighting switch 72 by way of a gating switch 74, and a reversing amplifier 78 connected to the timeweighting switch 72 by way of a gating switch 80. The output of switch 72 represents, at successive times, the successive terms in the expression for M' in equation (13). Positive terms are produced by turning on switch 74 but not switch 80 and negative times by turning on switch 80 but not switch 74. The successive values of $a_i$ (i.e. 7, 5, 3, 1, −1, −3, −5, −7) are produced by turning on time-weighting switch 72 for periods of time proportional to the corresponding coefficient.

The output M' of the LSA apparatus 36 is supplied in parallel to switches 82 and 84. When transmissions through the fluid in the upstream direction are being received, switch 82 is closed to pass the LSA output, while switch 84 is open, and conversely when downstream transmissions are being received. The output of switch 82 therefore represents the successive terms in the algorithm representing M' for upstream transmission, and the output of switch 84 represents the corresponding terms for the downstream transmission.

The output of switch 82 is supplied to an integrator 86 which sums the term-representing signals supplied to it between successive resets, i.e. forms such a sum for each frequency sweep during upstream transmission; an integrator 88 is supplied with the output of switch 84 at alternate times, to sum up the term-representing signals for each frequency sweep during downstream transmissions. Accordingly, the output of integrator 86 represents $M'_u$ and the output of integrator 88 represents $M'_D$. Each of these integrators may be a known commercially-available device. Reset pulses are applied to each integrator over reset lines 90 and 92, at the end of each frequency sweep.

The outputs of the two integrators are supplied to respective sample-and-hold devices 94 and 96, which are actuated at times controlled by pulse signal $f_s$ to sample the outputs of each integrator after each frequency sweep of the signals supplied to it, and to hold these sampled values until the next pulse $f_s$.

The outputs of the sample-and-hold devices, which themselves may be of conventional structure and operation, are supplied to respective analog multipliers 97 and 98 connected in the feedback paths of respective operational amplifiers 99 and 100. Each of these combinations, as is known in the art, will act as a functional inverter, i.e. will produce at the output terminal of the amplifier a signal which varies as the inverse function, or reciprocal, of the input signal. Accordingly, the output of amplifiers 99 and 100 are proportional to the functions $1/M'_u$ and $1/M'_D$ respectively. The signal level applied to the + input terminals of the operational amplifiers from level source 101 acts as a multiplicative scaling factor for the output signals, and in this case such level is preferably adjusted to produce a scaling factor equal to $\pi L/\Delta f$; accordingly, the two amplifiers outputs represent, respectively, the functions $\pi L/M_u$ and $\pi L/M_D$.

The latter outputs of the two op amps are supplied to respective input terminals of a conventional signal subtractor 104, which responds to produce an output signal representative of the function $\pi L\,1/M_D - \pi L\,1/M_u$, which is identically $\pi L\,(1/M_D - 1/M_u)$, as desired to represent the fluid velocity being measured. A low-pass filter 120 may optionally be used to smooth the output signal, and if used preferably has a breakpoint frequency somewhat lower than the upstream-downstream switching rate.

The level applied to the amplifiers 99 and 100 from source 101 may also include a scaling factor cosine $\alpha$, if it is desired that the output signal directly represent fluid velocity along the conduit axes A–A', rather than the velocity $V_F$ along the transducer axes.

Considering the factors affecting selection of the value of the divider D, the output $E_\theta$ of the phase detector 24 may be expressed as:

$$E_\theta = \theta \bmod 2\pi \qquad (14)$$

That is, $E_\theta$ is a monotonically increasing function of phase delay $\theta$; e.g. $\theta$ increases from zero to $2\pi$ radians, and repeats this every $2\pi$ radians. This gives a sawtooth characteristic, such as is shown for $E_\theta$ in the graph at the right of FIG. 2.

$\theta = \tau \omega_c$, where $\tau$ is the time delay of the acoustic waves in travelling from an acoustic transducer to the other and $\omega_c$ is the acoustic wave frequency in radians per second. To avoid phase ambiguity, the following condition should be met:

$$\theta_{max} < 2\pi \qquad (15)$$

To insure fulfillment of this condition, the dividing factor D may be selected so that the following is true:

$$D > \tau f_{max} \qquad (16)$$

where $f_{max}$ is the highest acoustic-wave frequency used in the measuring process. With such a value for D, the phase delay never exceeds the period P of the acoustic wave cycle and phase ambiguity is therefore avoided.

It is, however, possible to select the value of D somewhat smaller than is given by equation (16), and still obtain the desired operation. This may be accomplished by delaying the application of the reset pulses by an amount equal to the wave transit time delay $\tau$, which enables use of the full range of the phase detector; that is, the lowest divided-down frequency can then be selected to give a near-zero duty cycle of the signal from the phase detector 24, and the highest divided-down frequency selected to give near 100% duty cycle.

The same improvement can be obtained where, as depicted in FIG. 3, the received signal is always present, i.e. the switching between frequencies in each frequency sweep is substantially instantaneous. In such case the frequency of reference oscillator 20 in FIG. 1 is incremented by clock oscillator 42 so that, in the example of FIG. 3, the $f_8$ signal transmission starts at clock pulse 8 and persists after clock pulse 9 until clock pulse 10, at which time the frequency is shifted to $f_1$. Phase ambiguity is then avoided by selecting D to meet the following condition:

$$D > (\tau + 1/f_8) \Delta F,$$

where $\Delta F$ is the total frequency sweep, e.g. from $f_1$ to $f_8$.

In one preferred embodiment then, the sweep range may be from 30 KHz to 45 KHz ($\Delta F = 15$ KHz) to measure velocity of air flow through a 6-inch diameter pipe, with the axis of the opposed acoustic transducers at 45° to the pipe axis and with a maximum flow velocity of about 5 meters/second. The distance between transducers may be about 0.216 meter; the velocity of sound in air under normal operating conditions is about 330 meters/second.

Under such conditions the number of cycles of delay in transit, equal to L f/c, is 28 cycles at 45 Hz and 20 cycles at 30 KHz. The propogation delay in such case is 0.65 ms. Using these values in equation (17) gives a value of 10.08 for D, so that the next larger integral number 11 is therefore chosen for D, to prevent phase ambiguity.

In FIG. 3, for clarity of exposition the propogation time delay $\tau$ is shown as amounting to only a cycle or so of the transmitted frequency. In the practical example specified above, the transit delay $\tau$ is actually equal to a time of from about 20 to 28 cycles of the acoustic wave. Hence for the first 20-28 cycles of the reference signal following the start of each transmission at a new frequency, the phase-delay values $\theta$ are not valid, since during such time (about 0.65 ms in this example) the reference signal will represent the transmitted signal at the new frequency while the received signal will still be that due to the previous transmission at the former frequency. Accordingly, the weighting pulses $f_w$ are preferably not applied to render conductive the time-weighting switch 72 in FIG. 5 until at least 0.65 ms after each frequency shift. Also, because of the slow response of the filter 34, the weighting pulses should typically be delayed 2 to 3 ms after each change of frequency anyway. FIG. 3, for clarity, does not show such a gap between successive weighting pulses, but for the above reasons a minimum gap of about 2 ms between them is preferably provided.

If the maximum weighting pulse is chosen at about 3 ms, with a gap time of about 2 ms, a total of about 5 ms could be required for each frequency transmission. This would theoretically permit use of as many as about 500 phase samples per frequency sweep if desired, rather than the eight used in the present example, while allowing for one "upstream" sweep and one "downstream" sweep per half-second, to give a complete output-information update once each second, if so desired.

With regard to the overall timing of the exemplified system, reference is made especially to the timing diagrams of FIG. 4. At A are shown the clock pulses from clock oscillator 42. Counter and control logic 40 is supplied with these clock pulses and at each clock pulse increments by one frequency step the frequency of signal supplied to the transducer action at that time. In this example, eight frequencies per sweep are used, the first frequency $f_1$ starting at clock pulse 1 and continuing until clock pulse 2, at which time the frequency is switched to the next frequency $f_2$, and so on until the eighth frequency terminates at clock pulse 9, shortly after which the reset pulse of FIG. 4C occurs.

The $f_s$ pulse of FIG. 4B begins at clock pulse 1, and has a width such that its trailing edge defines the desired time for occurrence of the reset pulse.

At D of FIG. 4 are shown the weighting pulse signal $f_\omega$ applied to switch 72 in FIG. 5. The width of these pulses correspond to the values of the coefficients $a_i$ used in the LSA procedure; as mentioned above, a small gap will preferably be provided between all weighting pulses, including the $\theta_1$ and $\theta_2$ pulses.

At E of FIG. 4 are shown the LSA polarity pulses $f_a$, which turn on and off the gates 74 and 80 in FIG. 5, and at F of FIG. 4 are shown the transducer switch control signals $f_D$.

There has therefore been provided a system which measures fluid velocity accurately and reliably by transmitting acoustic waves of frequencies which differ from each other, by detecting the phase delays of such waves of different frequencies in traversing the fluid, by deriving from such data signals representative of the rate of change of phase delay with respect to frequency for such acoustic waves in traversing the fluid, and by deriving from the latter signals indications of the velocity of the fluid.

While the invention has been described with particular reference to specific embodiments thereof in the interest of complete definiteness, it may be embodied in a variety of forms diverse from those specifically shown and described, without departing from the spirit and scope of the invention.

What is claimed is:

1. The method of measuring the velocity of a fluid along a predetermined direction, comprising:
   transmitting acoustic waves through said fluid from a transmitting acoustic transducer to a receiving acoustic transducer;
   varying the frequency of said acoustic waves between different values;
   measuring the phase delays of said acoustic signals of different frequencies in travelling through said fluid from said transmitter acoustic transducer to said receiver acoustic transducer, to produce first signals representative of said phase delays;
   producing second signals representative of said different values of frequency of said acoustic waves; and
   deriving, from said first and second signals, third signals representative of the rate of change of said delays with frequency; and
   from said third signals, deriving fourth signals representative of said fluid velocity.

2. The method of claim 1, wherein said frequency is varied repeatedly among at least three values, and said deriving of said third signal comprises subjecting of said first and second signals to a least-squares-algorithm for deriving a statistically enhanced value of said third signal.

3. Apparatus for measuring the velocity of flow of a fluid along a predetermined direction, comprising:
   (a) signal-generating means for generating reference signals;
   (b) acoustic transmitter means responsive to said reference signals for transmitting corresponding acoustic waves along said direction;
   (c) acoustic receiver means for receiving said transmitter acoustic waves after they have traversed said fluid;
   (d) means for producing first signals representative of the frequency of said transmitted signal;
   (e) phase sensing means responsive to said received acoustic waves and to said reference signals for producing second signals representative of the phase delay of said received acoustic waves with respect to said transmitted acoustic waves;
   (f) frequency-changing means for changing the frequency of said transmitted acoustic waves, whereby said phase delay varies correspondingly;
   (g) means responsive to said first signals representative of frequency and to said second phase-delay representing signals to produce third signals representative of the rate-of-change of said phase delay with respect to said changes in frequency; and
   (h) means responsive to said third signal to produce output signals representative of said fluid velocity.

4. The apparatus of claim 3, wherein said frequency-changing means comprises means for changing said frequency in steps.

5. The apparatus of claim 4, wherein said steps are equal to each other.

6. The apparatus of claim 4, wherein said frequencies are of random values.

7. The apparatus of claim 4, wherein said frequency-changing means comprises means for varying said frequency among at least three different values, and said means to produce said third signal comprises least-squares-algorithm means supplied with said first and second signals.

8. The apparatus of claim 3, wherein said phase-sensing means comprises means for producing lower-frequency signals, one of which is at a submultiple of the frequency of said reference signal and in fixed phase relation thereto and the other of which is at the same submultiple of the frequency of said received waves and in fixed phase relation thereto, means responsive to said one and said other submultiple signal to produce a further signal having a duty cycle proportional to said phase delay of said received acoustic waves, and means responsive to said further signals for producing still other signals representative of said duty cycle and hence of said phase delay.

9. A method of determining the velocity of flow of a fluid along a predetermined direction, comprising:
   transmitting first acoustic waves of a varying plurality of frequencies along said direction from a first station to a second station;
   receiving said first acoustic waves at said second station, and producing from the received first acoustic waves a first signal representative of the phase delay of those of said first acoustic waves having one of said frequencies in travelling from said first station to said second station, and a second signal representative of the phase delay of those of said first waves having another of said frequencies in travelling from said first station to said second station;
   comparing said first and second signals to produce a third signal having a value $m_d$ representative of the rate of change $M_D$ of said phase delay of said first acoustic waves with respect to frequency;
   transmitting second acoustic waves of a varying plurality of frequencies in the direction opposite to said direction from said second station to said first station;
   receiving said second acoustic waves at said first station and producing from the received second acoustic waves a fourth signal representative of the phase delay of those of said second acoustic waves having one of the frequencies of said second acoustic waves in travelling from said second station to said first station and a fifth signal representative of the phase delay of those of said second acoustic waves having another of the frequencies of said second acoustic waves in travelling from said second station to said first station;
   comparing said fourth and fifth signals to produce a sixth signal having a value $m_u$ representative of the rate of change $M_U$ of said phase delay of said second acoustic waves with respect to frequency;
   supplying to computing means data as to said third signal representative of $M_D$, data as to said sixth signal representative of $M_U$, data representing said one and said other frequencies of said first and second acoustic waves, and data representing the distance L between said first and second stations, to compute therefrom the velocity of flow of said fluid along said direction.

10. The method of determining the velocity of flow of a fluid along a predetermined direction, comprising:
    transmitting first acoustic waves of a plurality of frequencies along said direction from a first station to a second station;
    receiving said first acoustic waves at said second station and producing from the received first acoustic waves a first signal representative of the phase delay of those of said first acoustic waves having one of said frequencies in travelling from said first station to said second station, and a second signal representative of the phase delay of those of said first waves having another of said frequencies in travelling from said first station to said second station;
    comparing said first and second signals to produce a third signal having a value $m_d$ representative of the rate of chan $M_D$ of said phase delay of said first acoustic waves with respect to their frequencies;
    transmitting second acoustic waves of a plurality of frequencies along said direction from said second station to said first station;
    receiving said second acoustic waves at said first station and producing from the received second acoustic waves a fourth signal representative of the phase delay of those of said second acoustic waves having one of the frequencies of said second acoustic wave in travelling from said second station to said first station and a fifth signal representative of the phase delay of those of said second acoustic wave at another of the frequencies thereof in travelling from said second station to said first station;

comparing said fourth and fifth signals to produce a sixth signal having a value $m_u$ representative of the rate of change $M_U$ of said phase delay of said second acoustic waves in travelling from said second station to said first station with respect to their frequencies;

supplying data representing said third signal representative of $M_D$, data representing said sixth signal representative of $M_U$, data representing said one and said other frequencies of said first and second acoustic waves, and data representing the distance L between said first and second stations to compute said velocity of flow V according to the formula $$V = \pi L \left( \frac{1}{M_D} - \frac{1}{M_U} \right).$$

* * * * *

UNITED STATES PATENT AND TRADEMARK OFFICE
CERTIFICATE OF CORRECTION

PATENT NO. : 4,616,510
DATED : October 14, 1986
INVENTOR(S) : James O. Moore It is certified that error appears in the above-identified patent and that said Letters Patent is hereby corrected as shown below:

In sheet 1 of the drawings --29-- should be added to Fig. 1 to designate the un-numbered shaper.

Column 5, line 67, in Equation 4, --$\pi$-- should be inserted before $f_d$ and before $f_u$.

Column 9, line 29, Equation 13 should read as follows:

-- $M' = (7\theta_1 + 5\theta_2 + 3\theta_3 + \theta_4 - \theta_5 - 3\theta_6 - 5\theta_7 - 7\theta_8)/K_M$ --

Signed and Sealed this

Eleventh Day of February, 1992

*Attest:*

HARRY F. MANBECK, JR.

*Attesting Officer*   *Commissioner of Patents and Trademarks*